United States Patent [19]
Mazabraud et al.

[11] Patent Number: 6,098,429
[45] Date of Patent: Aug. 8, 2000

[54] METHOD OF DRAWING FIBER CONTINUOUSLY BY BUTT WELDING OPTICAL FIBER PREFORMS

[75] Inventors: Pascal Mazabraud, Neuilly sur Marne; Abderrahman Alami Noureddine, Bezons, both of France

[73] Assignee: Alcatel, Paris, France

[21] Appl. No.: 09/244,625

[22] Filed: Feb. 4, 1999

[30] Foreign Application Priority Data

Feb. 5, 1998 [FR] France ................................. 98 01336

[51] Int. Cl.[7] .................................................. C03B 23/20
[52] U.S. Cl. .............................. 65/392; 65/271; 65/272; 65/407
[58] Field of Search ............................ 65/407, 272, 392, 65/271

[56] References Cited

U.S. PATENT DOCUMENTS

| | | | |
|---|---|---|---|
| 3,114,621 | 12/1963 | Kiraly | 65/272 |
| 3,489,544 | 1/1970 | Andrews | 65/272 |
| 4,407,667 | 10/1983 | LeNoane | 65/407 |

FOREIGN PATENT DOCUMENTS

| | | | |
|---|---|---|---|
| 151925 | 11/1901 | Germany | 65/272 |
| 29 32 196 | 2/1981 | Germany . | |
| 2 081 250 | 2/1982 | United Kingdom . | |

OTHER PUBLICATIONS

Patent Abstracts of Japan, vol. 97, No. 12, Dec. 25, 1997 corresponding to JP 09 202639 A (Kobe Steel Ltd.) Aug. 5, 1997.

*Primary Examiner*—John Hoffmann
*Attorney, Agent, or Firm*—Sughrue, Mion, Zinn, Macpeak & Seas, PLLC

[57] ABSTRACT

In the method of drawing fiber continuously from preforms for manufacturing an optical fiber, a first preform is displaced along a fiber-drawing axis and is drawn into an optical fiber through a fiber-drawing furnace disposed on the fiber-drawing axis, and a second preform is displaced along the fiber-drawing axis, which second preform is butt welded to the first preform so as to be drawn into an optical fiber following on from the first fiber. The two preforms are butt welded, i.e. they are welded together end-to-end, by displacing at least one power laser along the fiber-drawing axis, and by servo-controlling the displacement of said laser to the displacement of the two preforms so as to maintain a laser beam emitted by the power laser at the same height as the two ends to be welded together, thereby making it possible to reduce considerably the size of the zone affected by the welding, and to avoid polluting the side surfaces of the two preforms upstream and downstream from the weld.

3 Claims, 1 Drawing Sheet

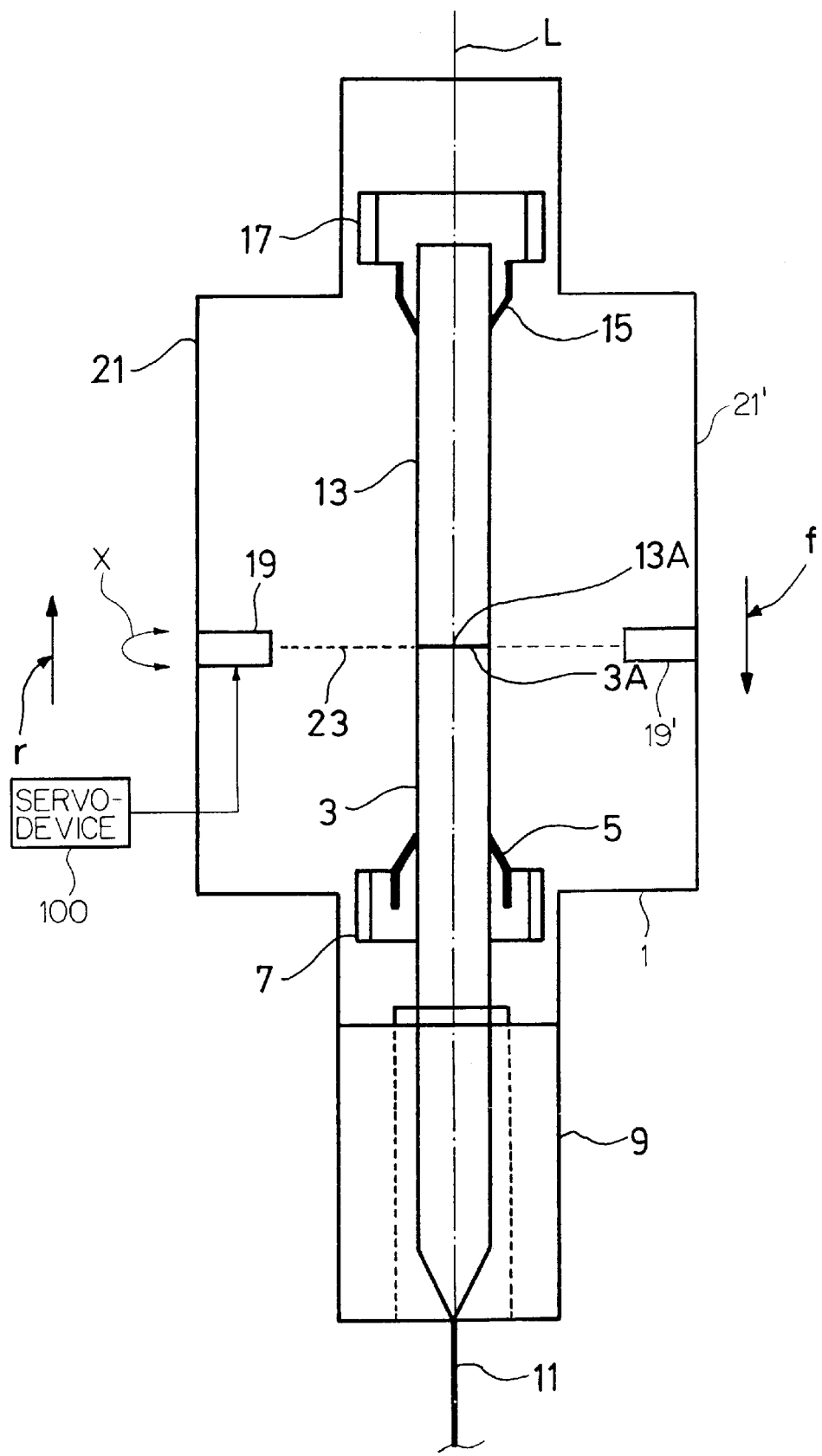

METHOD OF DRAWING FIBER CONTINUOUSLY BY BUTT WELDING OPTICAL FIBER PREFORMS

The invention relates to a method of drawing fiber continuously from preforms for manufacturing an optical fiber, in which method a first preform is displaced along a fiber-drawing axis and is drawn into an optical fiber through a fiber-drawing furnace disposed on the fiber-drawing axis, and a second preform is displaced along the fiber-drawing axis, which second preform is butt welded to the first preform so as to be drawn into an optical fiber following on from the first preform.

BACKGROUND OF THE INVENTION

A method of this type is known in particular from U.S. Pat. No. 4,407,667 published on Oct. 4, 1983 and claiming priority from French Patent Application FR 80 17005 filed on Jul. 31, 1980. The preforms are in the form of core rods designed to be built up while they are being displaced along the fiber-drawing axis, prior to being drawn into optical fiber. The core rods are butt welded, i.e. welded together end-to-end, by a welding station which is fixed relative to the fiber-drawing axis, and which comprises a furnace or an annular torch as a heat source for delivering the heat required for welding by melting the abutting ends of the two preforms. The two core rods are displaced along the fiber-drawing axis by rollers at the same speed of about 8 millimeters per minute.

The method described in that Application suffers from certain drawbacks.

Firstly, the displacement of the two preforms at a certain speed through the fixed welding station gives rise to heating of the preforms upstream and downstream from the two ends to be welded together. That surplus heat propagates axially along the preforms and contributes to extending the zone affected by the welding. When the preforms are drawn down, this zone often gives rise to an optical fiber that has degraded attenuation parameters, and that must be rejected from the output of the fiber-drawing method.

Secondly, the use of a furnace or of an annular torch as a heat source gives rise to pollution of the side surfaces of the preforms as they pass through the welding station.

OBJECTS AND SUMMARY OF THE INVENTION

An object of the invention is to provide a fiber-drawing method that mitigates the above-described drawbacks.

The basic idea of the invention is to weld together the two preforms by using a non-polluting heat source that is displaced along the fiber-drawing axis.

To this end, the invention provides a method of drawing fiber continuously from preforms for manufacturing an optical fiber, in which method a first preform is displaced along a fiber-drawing axis and is drawn into an optical fiber through a fiber-drawing furnace disposed on the fiber-drawing axis, and a second preform is displaced along the fiber-drawing axis, which second preform is butt welded to the first preform so as to be drawn into an optical fiber following on from the first preform, wherein the two preforms are butt welded, i.e. they are welded together end-to-end, by displacing at least one power laser along the fiber-drawing axis, and by servo-controlling the displacement of said laser to the displacement of the two preforms so as to maintain a laser beam emitted by the power laser at the same height as the two ends to be welded together.

By displacing the power laser along the fiber-drawing axis, and by servo-controlling its displacement to the displacement of the two performs so as to maintain the laser beam at the same height as the two ends to be welded together, the size of the zone affected by the welding is considerably reduced.

The laser beam is maintained at the same height as the two ends of the preforms to be welded together so that, upstream and downstream from the weld zone, the side surfaces of the two preforms are not exposed to the laser, and are therefore not polluted.

BRIEF DESCRIPTION OF THE DRAWING

Other characteristics and advantages of the invention appear on reading the following description of an implementation of the invention shown in the sole FIGURE which diagrammatically shows a fiber-drawing unit making it possible to implement a method of the invention.

MORE DETAILED DESCRIPTION

A method of drawing fiber continuously from preforms for manufacturing an optical fiber is implemented (sole FIGURE) by means of a preform-lowering machine 1 for displacing a first preform 3 in translation along a fiber-drawing axis L, which preform is fixed in a chuck 5 secured to a first carriage 7 mounted to move along the fiber-drawing axis. The first preform 3 is lowered by the first carriage 7 through a fiber-drawing furnace 9 disposed along the fiber-drawing axis L so as to be heated and drawn into an optical fiber 11 received by a fiber-receiving reel (not shown).

A second preform 13 is displaced in translation along the fiber-drawing axis L by means of the preform-lowering machine 1 by being fixed in a chuck 15 secured to a second carriage 17 mounted to move along the fiber-drawing axis.

Both carriages 7 and 17 are displaced in the fiber-drawing direction, indicated by arrow f in the FIGURE, at the same speed of translation V. The second preform 13 is placed in the preform-lowering machine 1 and clamped in the chuck 15 on the second carriage 17 in a manner such that the two preforms 3 and 13 are initially separated from each other and are then disposed end-to-end, their contact faces being carefully polished.

The second preform 13 is butt welded, i.e. welded end-to-end, to the first preform 3 and it is displaced in translation along the fiber-drawing axis by the second carriage 17 so as to be heated in the fiber-drawing furnace and drawn into an optical fiber following on from the first preform. At the end of drawing fiber from the first preform 3, the chuck 5 of the first carriage 7 is opened to enable said first carriage to be offset relative to the fiber-drawing axis L and to be displaced by the preform-lowering machine 1 in the direction opposite to the fiber-drawing direction and indicated by arrow r in the FIGURE. The first carriage is put back onto the fiber-drawing axis to take up the initial position of the second carriage 17 so as to enable a third preform to be put in place end-to-end with the second preform, and thus to enable the preforms to be drawn down continuously.

In the invention, the two preforms 3 and 13 are butt welded by displacing a power laser 19 along the fiber-drawing axis L and by servo-controlling the displacement of the laser to the displacement of the two preforms so as to maintain a laser beam at the same height as the two ends 3A and 13A to be welded together.

In the FIGURE, a power laser 19 is guided in displacement parallel to the fiber-drawing axis L by a guide rod 21 secured to the preform-lowering machine 1. Power laser 19' is guided by guide rod 21'. The power laser 19 is displaced in the fiber-drawing direction f by means of a conventional mechanism, and it is servo-controlled by a servo-device 100 to the displacement of the two preforms along the preform-lowering machine 1 to maintain a laser beam 23 at the same height as the two ends 3A and 13A of the preforms to be welded together. By servo-controlling the displacement of the power laser 19 to the displacement of the two preforms, it is possible to reduce the size of the zone affected by the welding. The energy supplied by the laser is focussed onto the two ends 3A and 13A of the preforms to be welded together so that the side surfaces of the two preforms, upstream and downstream from the weld zone are not exposed to the beam, and are thus not polluted.

At the end of drawing fiber from the first preform 3, the power laser 19 is switched off and is displaced by the above-mentioned conventional mechanism in the direction r opposite to the fiber-drawing direction, e.g. simultaneously with the first carriage 7, so as to take up an initial position at the same height as the two abutting ends respectively of the second preform and of a third preform which is installed in the preform-lowering machine in place of the first preform.

In a first variant implementation of the invention, three power lasers (only two power lasers 19, 19' are shown in the FIGURE) are disposed in a plane perpendicular to the fiber-drawing axis, and they are distributed about the fiber-drawing axis at 120° intervals. They are displaced together parallel to the fiber-drawing axis and their displacement is servo-controlled to the displacement of the two preforms so as to maintain the three laser beams at the same height as the two abutting ends of the preforms to be welded together.

In the first variant implementation of the invention, the two ends to be welded together are melted rapidly and uniformly in the welding plane.

In a second variant implementation of the invention, the power laser is displaced in rotation alternately in one direction and in an opposite direction about the fiber-drawing axis L (as shown by the double headed arrow x in the FIGURE) while simultaneously being displaced in translation parallel thereto.

A plane support is disposed perpendicularly to the fiber-drawing axis, and it is guided in translation parallel to the fiber-drawing axis by a guide rod, a central opening enabling the preforms to pass through said plane support.

The power laser is mounted on the plane support to rotate by describing a circle about the fiber-drawing axis, the laser beam being directed towards the two ends of the two preforms to be welded together.

The displacement of the plane support in translation is servo-controlled to the displacement of the two preforms so that the laser beam is maintained at the same height as the two ends of the preforms to be welded together.

The displacement of the power laser in rotation is chosen as a function of a number of alternating revolutions that is high enough to melt the two ends and to weld together the two preforms while they are being lowered by the preform-lowering machine.

In the second variant implementation of the invention, the heat required to melt the two abutting ends of the two preforms is fed continuously to the periphery of the two ends, thereby making it possible for melting to be rapid and uniform with a single power laser.

What is claimed is:

1. A method of drawing fiber continuously from preforms for manufacturing an optical fiber, in which method a first preform is displaced along a fiber-drawing axis and is drawn into an optical fiber through a fiber-drawing furnace disposed on the fiber-drawing axis, and a second preform is displaced along the fiber-drawing axis, which second preform is butt welded to the first preform so as to be drawn into an optical fiber following on from the first preform, wherein the two preforms are butt welded by displacing at least one power laser along the fiber-drawing axis, and by servo-controlling the displacement of said laser to the displacement of the two preforms so as to maintain a laser beam emitted by the power laser at the same height as the two ends to be welded together.

2. A method according to claim 1, in which the two preforms are butt welded by displacing the power laser simultaneously in translation along the fiber-drawing axis and in rotation thereabout.

3. A method according to claim 1, in which the two preforms are butt welded by displacing a plurality of power lasers along the fiber-drawing axis, which lasers are disposed in a plane perpendicular thereto and are distributed thereabout, and by servo-controlling the overall displacement of the lasers to the displacement of the preforms so as to maintain a laser beam emitted by each power laser at the same height as the two ends to be welded together.

* * * * *